United States Patent [19]

Ring

[11] 3,878,958

[45] Apr. 22, 1975

[54] HAND TRUCK WITH UNLOADING LINKAGE

[76] Inventor: Fred C. Ring, 1817 Portage St., Kalamazoo, Mich. 49001

[22] Filed: Aug. 15, 1974

[21] Appl. No.: 497,577

[52] U.S. Cl............................ 214/511; 280/47.27
[51] Int. Cl............................................. B62b 1/14
[58] Field of Search ...... 280/47.27, 47.29; 214/511, 214/510

[56] References Cited
UNITED STATES PATENTS

| | | | |
|---|---|---|---|
| 2,452,258 | 10/1948 | Nielsen | 214/511 |
| 2,838,193 | 6/1958 | Statton | 214/511 |
| 3,308,978 | 3/1967 | Smith | 214/511 |
| 3,403,800 | 10/1968 | Botello | 280/47.27 |

Primary Examiner—David Schonberg
Assistant Examiner—John A. Pekar
Attorney, Agent, or Firm—Austin A. Webb

[57] ABSTRACT

A two wheeled hand truck with a fixed load platform at the bottom has a back plate swingably supported from near the upper ends of the truck handles. Toggle links connected between the back plate and skid rails on the back of the handles and truck frame are connected by links to cranks pivoted between the upper ends of the skids. A handle connected to the crank pivot serves to depress the links, and open the toggle links and swing the back plate, thus pushing any load off of the front of the truck.

4 Claims, 2 Drawing Figures

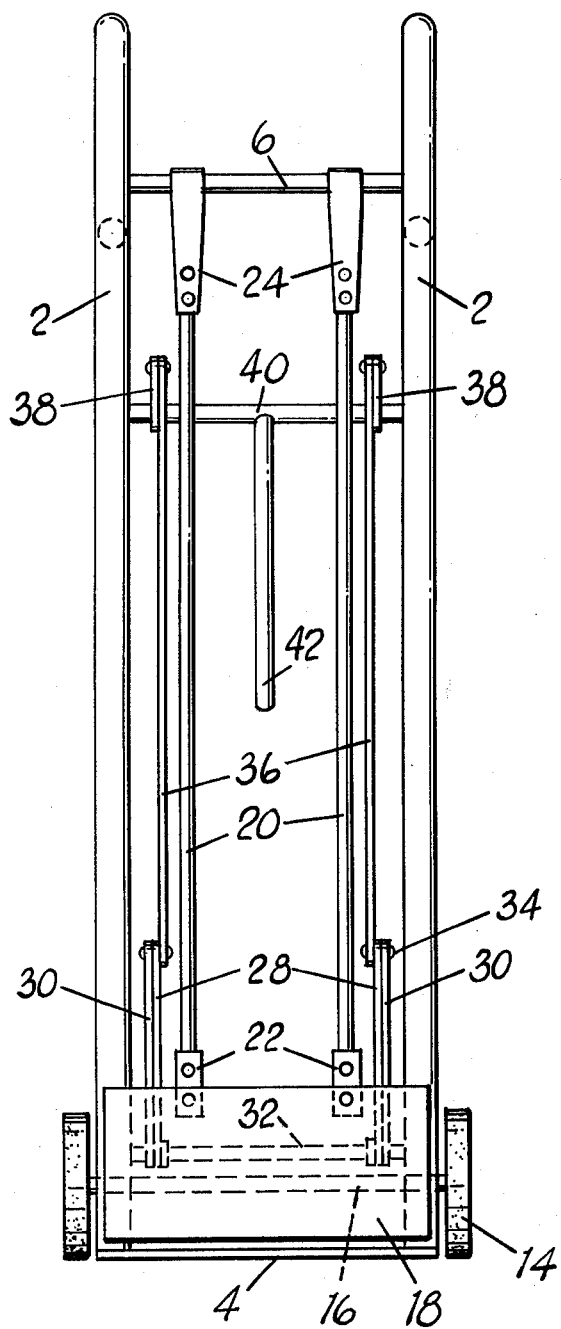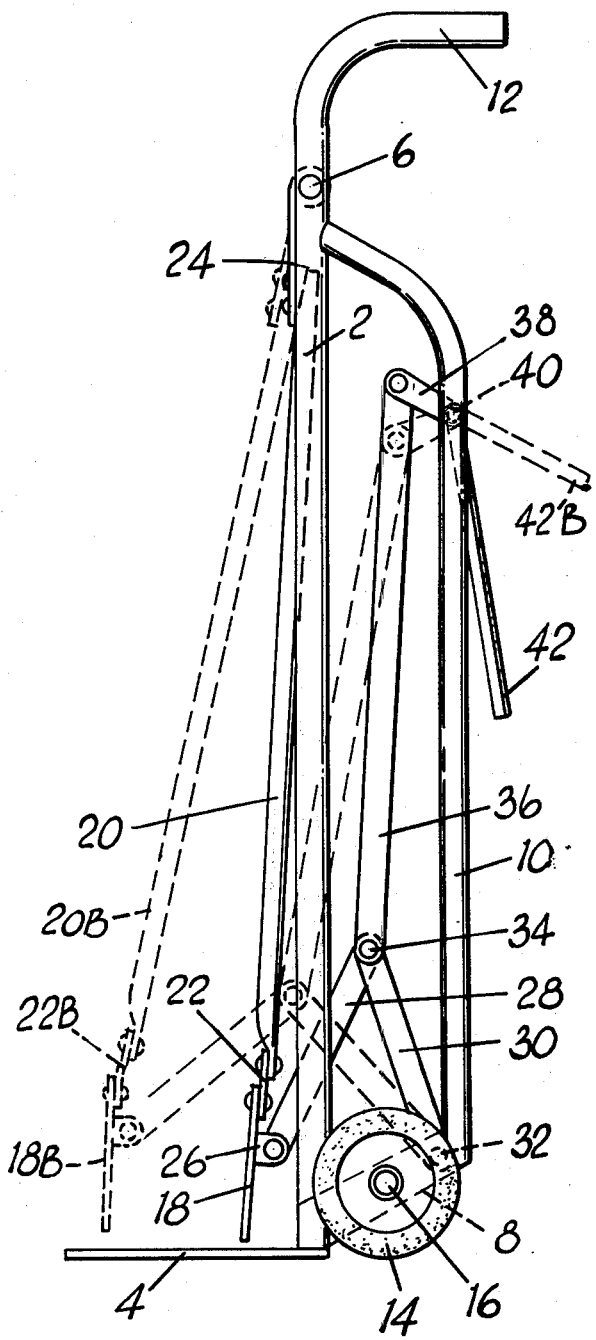

HAND TRUCK WITH UNLOADING LINKAGE

OUTLINE OF INVENTION

Hand trucks for moving boxes and packages are now commonly provided with back skids to permit the loaded truck to be slid down over the back edge of the bed of a van or other elevated surface. After the truck and load have reached ground level, the workman who lowers the hand truck has much difficulty in disengaging the truck from under the load; and usually must climb down from the bed of the van, disengage the hand truck, lift the hand truck into the van, and then climb back into the van for each succeeding load.

The present invention provides the familiar old type of hand truck with a new swingable back plate and operating toggles and levers which permit the workman to push the load off of the hand truck while standing on the elevated surface or van bed from which the truck and its load have been lowered. The same handle used to actuate the truck unloading linkage can then be used to lift the empty truck back into the van. The workman can thus deposit as many loads as desired behind the rear of a van while only climbing into and out of the van once.

DESCRIPTION

The drawings, of which there is one sheet, illustrate a preferred form of the invention.

FIG. 1 is a front elevational view of the hand truck of the invention.

FIG. 2 is a side elevational view of the truck.

The truck comprises a frame including upright side rails 2 connected at the bottom by a load plate 4 generally perpendicular to the side rails. The upper ends of the side rails are connected by a cross member 6, which also serves as a pivot as will be described. Struts 8 project rearwardly and upwardly from the lower ends of the side rails, and connect to skid bars 10 that extend in spaced parallel relation to the side rails and curve forwardly at their upper ends for connections to the side rails. The upper ends of the side rails curve rearwardly in operating handle portions 12. The wheels 14 of the truck are mounted on the ends of the axle 16 supported through the struts 8. All of the foregoing is conventional hand truck construction and various modifications may be made therein as desired.

A movable back plate 18 is swingably supported in generally upright position over the load plate and in overlapping relation to the lower ends of the side rails. The back plate is supported by two spaced suspension bars 20 which are connected to the upper edge of the plate by connectors 22. The connectors are either loose or somewhat flexible to permit the suspension bars to swing at a slight angle to the back plate, as is shown by the dotted positions of the parts at 18 B and 20 B in FIG. 2. The upper ends of the suspension bars are pivotally connected to the cross bar 6 by hanger straps 24 looped over the cross bar.

The back of the back plate 18 has two spaced ears 26 attached thereto, and each ear is pivotally connected to the forward link 28 of a pair of toggles. The rear links 30 of the toggles are pivoted on a cross bar 32 extending between the struts 8 behind the axle. The central pivots 34 of the toggles are connected to control links 36 that extend upwardly to cranks 38 projecting from a rock shaft 40 journalled between the upper ends of the skids 10. An operating lever 42 connected to the rock shaft hangs between the skids when the back plate 18 is in retracted position.

When a workman, working in a van, has piled a stack of cases on the load plate and wheeled the load to the rear of the van and lowered it to the ground by means of the skids 10 and handles 12, he can grasp the lever 42 and raise it to the dotted position 42 B. This pushes the back plate to dotted position 18 B and pushes the stack of cartons off of the truck, or as may be the case when the cartons are heavy, the truck is pushed backwardly out from under the stack of cartons. Then, without dismounting from the van, the workman can lift the empty hand truck back into the van by means of either the lever 42 or the handles 12; to unload successive stacks from the van.

It will be understood that various changes in details of the parts illustrated may be made without departing from the spirit and the scope of the invention as defined in the following claims.

What is claimed as new is:

1. In combination with a hand truck having side rails and handles, and a load plate projecting forwardly from the bottoms of the side rails, wheels mounted at the lower ends of the side rails, and skids projecting upwardly from the rear of said wheels, truck unloading mechanism comprising;

a backing member movably supported in transversely extending relation to said load plate and in front of said side rails, lever means connected to move said backing member forwardly across the major portion of the length of said load plate, and an operating handle pivotally connected to the truck and said lever means and operable from the upper part of said truck to actuate said lever means to move said backing member forwardly upon upward motion of the handle.

2. The combination with a hand truck as defined in claim 1 in which said backing member is a plate suspended from suspension bars pivoted near the upper end of said truck, and said lever means includes at least one set of toggle links pivotally connected to each other and to said backing plate and a fixed point on said truck.

3. The combination with a hand truck as defined in claim 2 in which the connection between said backing plate and said suspension bars permits relative angular motion between the bars and plate.

4. The combination with a hand truck as defined in claim 2 in which said operating handle is a first crank pivoted between the upper ends of said skids, another crank connected to be rotated with said first crank, and a connecting link between said other crank and said toggle links.

* * * * *